US005667876A

United States Patent [19]

Radlicz

[11] Patent Number: 5,667,876

[45] Date of Patent: Sep. 16, 1997

[54] INFORMATIVE CARD MADE OF SHEET METAL

[75] Inventor: Andrew Radlicz, Loudon, Tenn.

[73] Assignee: J.L. Clark, Inc., Rockford, Ill.

[21] Appl. No.: 647,753

[22] Filed: May 15, 1996

[51] Int. Cl.[6] .......... B32B 9/00

[52] U.S. Cl. .......... 428/192; 428/13; 428/14; 428/76; 428/172; 428/187; 428/195; 428/204; 428/207; 428/209; 283/74; 206/449

[58] Field of Search .......... 428/192, 195, 428/209, 13, 14, 76, 187, 207, 172, 204; 206/449; 283/74

[56] References Cited

U.S. PATENT DOCUMENTS 5,215,792 6/1993 Miller .......... 428/14
5,363,964 11/1994 Hexter, Jr. .......... 206/449

*Primary Examiner*—Patrick Ryan
*Assistant Examiner*—Abraham Bahta
*Attorney, Agent, or Firm*—Leydig, Voit & Mayer, Ltd.

[57] ABSTRACT

An informative card, such as a baseball trading card, has a rectangular shape and is made of sheet metal in such a way that it is free of pointed corners or exposed raw edges. The informative card comprises a single-layer metal blank which has a burr in the form of an upstanding pointed ridge along the periphery of the blank. A protective film, such as a layer of varnish, is applied on the card to cover the side with the burr so that the burr is shielded.

16 Claims, 1 Drawing Sheet

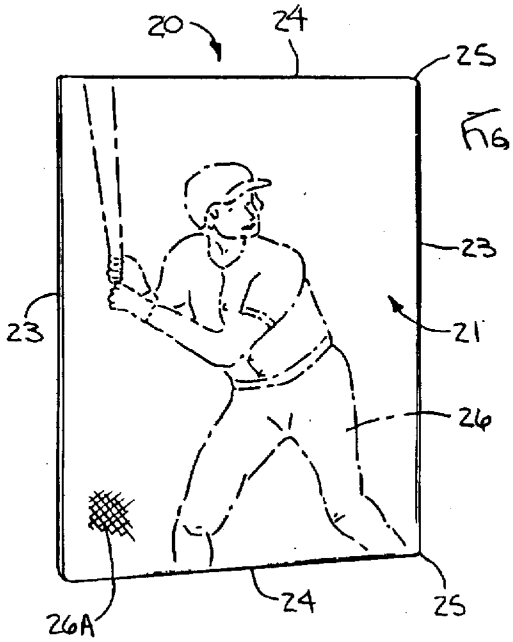
FIG. 1
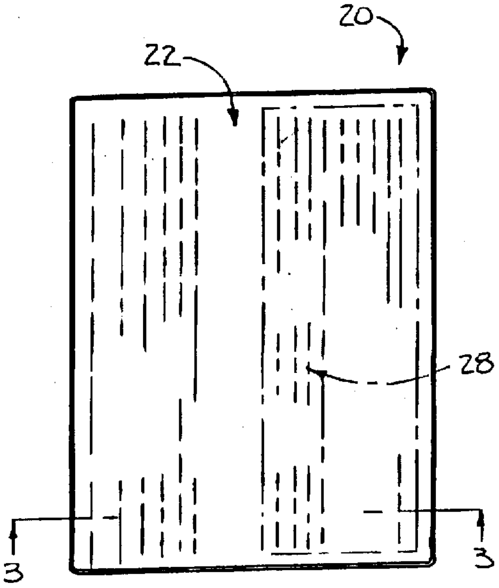
FIG. 2
FIG. 3
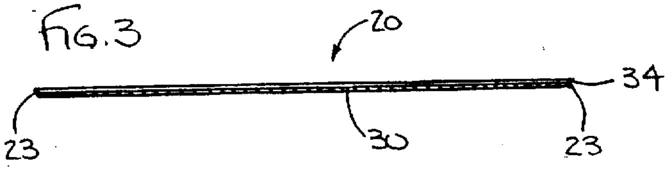
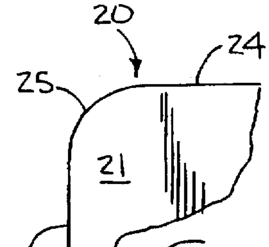
FIG. 7
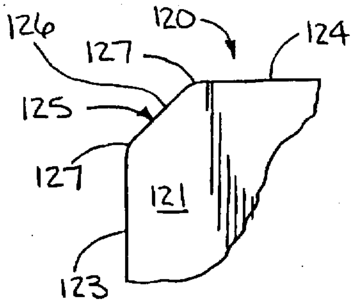
FIG. 8
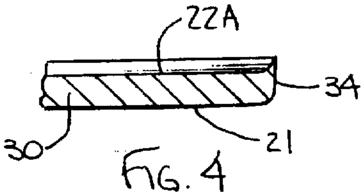
FIG. 4
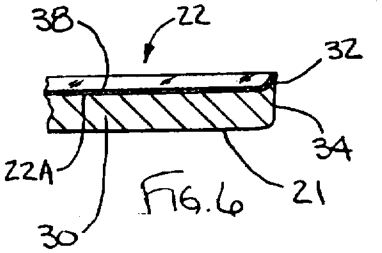
FIG. 6
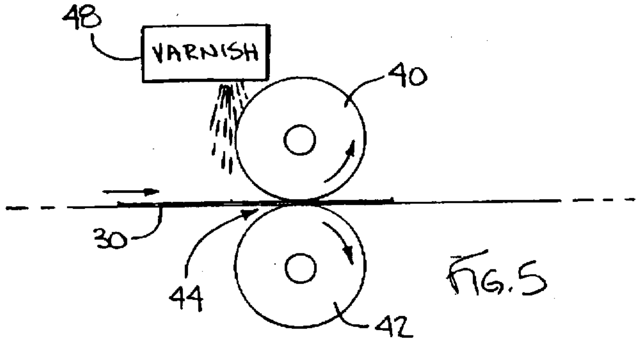
FIG. 5

INFORMATIVE CARD MADE OF SHEET METAL

FIELD OF THE INVENTION

This invention relates generally to informative cards, such as baseball trading cards, and more particularly to informative cards made of sheet metal.

BACKGROUND OF THE INVENTION

Baseball card trading, like baseball itself, has been a part of American culture, and baseball cards are treasured collections and valuable commodities of not only many children but many adults alike. A baseball trading card typically displays a photograph of a baseball player on the front side, and career statistics or other data of the player are usually printed on the back of the card. Conventionally, baseball trading cards are made of paperboard or other paper-like material. The obvious drawback of paper cards is that they do not endure repeated shuffling and handling, and are damaged easily.

Recently, baseball trading cards made of sheet metal are becoming increasingly popular. One of the reasons for their popularity is, of course, that they are much more durable than paper cards and therefore are more "permanent." Another reason for their popularity is that the workability of metal allows the metal cards to be shaped, such as by embossing, to create visual effects not easily achievable on paper cards. For example, U.S. Pat. No. 5,215,792 to Miller and assigned to the same assignee of the present invention discloses such an informative card made of a single sheet of metal. The four edge portions of the informative card comprise hems folded on the rear side of the card. The front side of the card contains a central display region which is offset slightly towards the rear so as to leave a raised peripheral ledge framing the central display region. The resultant card is similar to conventional paperboard baseball cards in thickness but has a more attractive appearance. Because the edges of the card are folded, the metal information card is generally free of sharp edges and sharp points. However, a short length of the raw edge of the sheet metal remains at each corner of the card, and such raw edges, albeit very short, may still cause safety concerns.

It has also been proposed to make baseball cards with a combination of metal and paper. For example, U.S. Pat. No. 5,363,964 to Hexter discloses a baseball trading card having a metal substrate holding a printed cardboard insert in the front. The four edge portions of the metal substrate are rolled towards the printed cardboard such that the metal edges grip the cardboard and hold it in position. A significant disadvantage of such a paper/metal trading card is that it is several times thicker than conventional paper baseball cards due to its thick rolled edges. Thus, the paper/metal trading card does not look like a conventional baseball trading card but, rather, resembles a miniature framed picture. The paper/metal trading card also cannot be shuffled like a conventional trading card. Such deviation from the look and feel of conventional baseball trading cards makes the paper/metal trading cards undesirable to many collectors. Another disadvantage of such a card is its relatively high cost because each card requires both a printed cardboard element and a formed metal sheet.

Besides the respective drawbacks of the prior art all-metal or paper/metal baseball trading cards as described above, another unsatisfactory aspect common to those cards is that the formation of each card requires several sheet metal processing steps. Thus, to form the card of Miller, the metal sheet has to be first formed into blanks, and several subsequent steps are performed to form the edges of a blank into hemmed edges. Similarly, the formation of the card of Hexter requires a blanking step to form the metal blank, and other metal forming steps are required to roll the edges of the metal blank towards the cardboard insert. Because each metal processing step requires a distinct tool set and machine setup, the cost of a card depends directly on the number of metal forming steps required to form the card. Since a baseball card is intended to be a relatively inexpensive item, it is highly desirable to simplify the manufacturing process to reduce the cost of the card.

SUMMARY OF THE INVENTION

In view of the foregoing, it is a primary object of the present invention to provide a metal informative card which resembles a conventional baseball trading card and has no exposed raw edges or sharp corners so that it can be handled much like conventional cardboard informative cards.

It is an object of the present invention to provide a metal informative card which has no raw edges or sharp corners and which requires fewer metal processing steps to form as compared to prior art metal informative cards.

It is a further object of the present invention to provide a metal informative card formed in a way which eliminates raw edges and sharp corners without substantially increasing the thickness of the card.

According to these and other objects of the present invention, there is provided an informative card that comprises a single-layer metal blank covered with a protective film. The card has a substantially rectangular shape, with first and second sides, four straight edges, and four corners joining the straight edges. The corners are shaped to be free of discontinuities. At least one of the first and second sides carries an indicia. The metal blank has a peripheral burr which has the form of a pointed upstanding ridge on the first side of the metal blank and is substantially continuous around the periphery of the card. The protective film covers the first side and extends to cover the peripheral burr. The film is sufficiently thick to shield the point of the peripheral burr, so that the burr is not exposed.

It is a feature of the present invention that only one metal processing step, namely the blanking step in which the metal blank is cut, is required to form the metal card. No further metal forming steps such as hemming or rolling, etc., are required to shape or form the edge of the blank to eliminate the raw metal edges. In accordance with a feature of the present invention, a protective film is adhered to the side with the burr formed in the blanking step, so that the burr is covered by the film, and the covered burr is sufficiently shielded to prevent accidental cutting or snagging. The elimination of the need for any additional metal processing steps and the associated tool sets and machine setup results in significant savings in the cost of the card.

Other objects and advantages will become apparent with reference to the following detailed description when taken in conjunction with the drawings in which:

BRIEF DESCRIPTION OF THE DRAWINGS

FIG. 1 is a front perspective view of a metal informative card constructed according to the present invention and carrying a picture of a baseball player;

FIG. 2 is a rear elevation of the metal informative card with printed material on the rear side;

FIG. 3 is a cross sectional view of the card along the line 3—3 in FIG. 2;

FIG. 4 is an enlarged fragmentary cross sectional view of the edge portion of the metal blank forming the informative card;

FIG. 5 is a schematic view illustrating the step of applying a layer of varnish to the metal blank to form the informative card;

FIG. 6 is an enlarged fragmentary cross sectional view of the edge portion of the informative card;

FIG. 7 is a fragmentary front elevation showing a corner of the informative card; and FIG. 8 is a fragmentary front elevation showing a corner of an alternative embodiment of a metal informative card.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, for purposes of illustration the invention has been shown in the drawings as embodied in a baseball trading card. It will be appreciated, however, that other types of images or information can be printed on the card, and, indeed, the card of the present invention may have a size different from that of a conventional baseball trading card, depending on the use of the card.

FIG. 1 shows, in a perspective view, the front side 21 of a metal informative card 20 embodying the present invention. The card 20 is substantially flat and has a generally rectangular shape, with two long edges 23 and two short edges 24 extending at right angles to the long edges. The four straight edges are joined at four corners 25. Exemplifying the practice of the present invention, a photograph 26 of a baseball player is printed on the front side 21 of the card. The rear side 22 of the card 20 is shown in FIG. 2. As is conventional for baseball trading cards, printed material 28 showing career statistics of the player or other information is printed on the rear side 22 of the card. Preferably the card 20 has the size of a conventional baseball trading card, with a length of approximately 3.5 inches and a width of approximately 2.5 inches.

The metal informative card of the present invention has a very simple structure. As illustrated in the cross sectional view of FIG. 3, the card 20 has a sheet metal body in the form of a single-layer metal blank 30. The edges 23, 24 of the metal blank 30 are not hemmed or rolled, or formed by any other techniques of metal processing.

Indeed, it is a feature of the present invention that the only sheet metal forming step required to produce the card is the blanking step in which the metal blank 30 is cut, and no subsequent metal forming steps are required to form the raw metal edges of the blank.

Generally, in the blanking process, the sheet metal from which the blank 30 is cut is placed between a punch and a die, and the punch is moved towards the die to punch out the blank. The shape of the blank is thus readily determined by the shape of the punch and the die. In the blanking process, the dies displace metal at the edges of the blank. The result is the formation of an upstanding continuous burr along the peripheral edge of the blank. As can be best seen in the enlarged cross sectional view of FIG. 6, the metal blank 30 has a burr 32 in the form of an upstanding, rather sharply pointed, ridge which is substantially continuous around the entire periphery of the metal blank 30. Besides the burr 32, the surface of the peripheral edge 34 is substantially smooth and partially burnished as a result of the blanking process. The burr is on the side 22A of the blank which faces the punch in the blanking step. For illustrative purposes, the burr 32 in the present embodiment is shown to be on the rear side 22 of card. It will be appreciated, however, that the side with the burr may also be designated as the front side, if so desired. For example, a picture of a baseball player may be lithographed on the side with the burr, and this side would then normally be called the front side of the card.

In contrast to the approach in the past to eliminate raw metal edges of metal informative cards by forming the edges into hemmed or rolled edges or the like, the present invention takes a much simpler and significantly less expensive, yet effective, approach to "eliminate" the raw metal edges. As illustrated in FIG. 6, a protective film 38 is adhered to the side with the burr 22A and covers the burr. The film is of sufficient thickness to effectively shield the pointed ridge of the burr. The word "shield" is sometimes used herein to indicate the character of a coating which is sufficiently thick to cover a pointed feature, like the pointed ridge, to produce a thicker somewhat rounded or contoured coating which renders the pointed feature much less susceptible to producing accidental cuts. In the present invention, the burr shielded by the protective film, is intended not to cut the hand of a customer or snag on other cards or other objects. The film 38 is preferably substantially transparent so that images or information printed on the burr side 22A and covered by the film will not be obscured from view. The film 38, however, may be colored to enhance the appearance of the card.

There are a number of different materials which can be coated on the burr side 22A to form the protective film, and different methods may be used for coating such materials. In the currently preferred embodiment, the protective film 38 is a layer of varnish applied over the rear side 22A of the metal blank 30 and over the burr 32. The varnish layer is sufficiently thick and beads over the tip of the burr 32. In this way, the sharp tip of the burr 32 is buried in and under the varnish layer 38 so that it is shielded.

Alternatively, the protective film may be a plastic film laminated on the side 22A to cover the burr 32. As a further example, the film may be a layer of epoxy coated on the surface of the side 22A.

In forming the metal blank 30, it is important that the punch and the die are so shaped that the corners of the metal blank 30 are free of discontinuities. Discontinuities at the corners are undesirable because the protective film, which is on the side surface 22A, may not effectively cover the discontinuities at the peripheral edge 34 of the card. Moreover, the protective film may also fail to cover the burr 32 at the discontinuities. For example, in the preferred embodiment the protective film is a layer of varnish applied on the card and hardened by heating or UV curing. The varnish will not be effectively retained at a discontinuity when applied thereon, due to the surface tension of the varnish. Both the discontinuity and the burr thereon are therefore likely to remain exposed on the finished product.

Accordingly, preferably the corners of the metal blank are smoothly curved. FIG. 7 is an enlarged view of a corner 25 of the metal card 20 of FIG. 1. As illustrated, the corner 25 is rounded to avoid discontinuities. FIG. 8 shows another embodiment of a card 120. In this embodiment, each corner 125 of the card has a diagonal section 126 extending between two adjacent straight edges 123,124. The diagonal section 126 is faired at 127 into the adjacent straight edges so that there are no sharp corners formed.

The preferred process for forming the metal informative card of the present invention will now be described. A metal sheet is first printed, typically on both sides, using conventional metal printing techniques to produce multiple images of baseball cards over the surface of the sheet. The sheet is then transferred to a blanking press, where the individual blanks are stamped from the sheet to form individual metal blanks 30. FIG. 4 provides an enlarged cross sectional view of the edge portion of the metal blank 30 formed in the blanking step. Because no further metal processing steps are performed on the metal blank thus produced, the size and shape of the metal blank 30 is the final size and shape of the informative card. Preferably the metal blank 30 has the dimensions of a conventional baseball trading card, with a length of about 3.5 inches and a width of about 2.5 inches. The thickness of the sheet metal forming the blank is preferably on the order of 0.009 inch.

One general advantage of metal informative cards over paper cards is that metal cards may be formed, such as by embossing, to create visual effects to further enhance the appearance of the card. Such embossing can be combined with the blanking step by using a suitable die set. Thus, if desired, the metal blank can be cut and embossed in the same blanking step without the need of further metal forming steps. The area 26A of FIG. 1 is intended to represent an embossed region.

After the metal blank 30 is formed, a layer of varnish is applied to the rear side 22A of the metal blank. The application of varnish may be performed, for example, by means of a small roll coater. Such a varnishing process is schematically shown in FIG. 5. As illustrated, the metal blank 30 is passed through a nip 44 between an application roller 40 and a support roller 42, with the side with the burr facing the application roller. A varnish source 48 provides vanish to the surface of the application roller 40, which carries the varnish to the surface 22A of the metal blank 30 to form a substantially uniform layer. Other varnishing techniques, of course, may be used to apply the varnish layer on the metal blank 30. After the step of varnishing, the metal blank 30 is preferably put in an oven to accelerate the hardening of the varnish layer 38 (FIG. 6). Alternatively, the varnish layer may be UV cured. The completed card 20 has been illustrated in FIGS. 1, 2, and 6.

In a further embodiment, instead of using a roll coater to provide a liquid coating which is subsequently cured, a plastic film is mechanically positioned over the blank to cover the burr side including the pointed edges. Heat and pressure are then applied (for example in a nip like FIG. 5 or a simpler mechanical press, to cause the plastic film to adhere as by lamination to the printed surface of the blank.

It will be appreciated that what has been provided is a new and improved metal informative card, and a method to make such a card. The card is free of sharp corners and exposed raw edges and is very simple and inexpensive to make. The card comprises a metal blank formed by a blanking step, and a protective film is attached to the blank to cover the peripheral burr formed in the blanking step. Because the formation of the card requires only one simple metal forming step, namely the blanking step, the card is very inexpensive to make while being as functional as prior art metal informative cards.

What is claimed is:

1. An informative card formed of thin metal sheet comprising:

a substantially flat and generally rectangular single-layer metal blank having first and second sides, four straight edges, four corners joining the straight edges and shaped to be free of discontinuous, and continuous peripheral burr of metal displaced in blanking and shaped in the form of an upstanding pointed ridge on the first side of the metal blank, at least one of the first and second sides carrying an indicia, the metal blank having no formed edges; and a protective film on the first side covering the peripheral burr and of sufficient thickness to shield the point of the burr.

2. An informative card as in claim 1, wherein the protective film is a layer of transparent varnish applied on the first side.

3. An informative card as in claim 1, wherein the protective film is a transparent plastic film laminated to the first side.

4. An informative card as in claim 1 wherein the card is about 3.5 inches long and about 2.5 inches wide.

5. An informative card as in claim 4 wherein the thin metal sheet is on the order of 0.009 inches in thickness.

6. An informative card as in claim 1, wherein the corners are smoothly rounded.

7. An informative card as in claim 1, wherein each of the corners has a straight diagonal segment smoothly fairing into the adjacent edges.

8. An informative card as in claim 1 wherein the informative card has a printed indicia applied to at least one side thereof.

9. An informative card as a in claim 8 in which the informative card also carries an embossed indicia.

10. A method for producing a metal informative card comprising the steps of:

blanking a metal sheet to form a substantially flat metal blank having a generally rectangular shape including first and second sides, four straight edges, four corners joining the straight edges and shaped to be free of discontinuities, the blanking step forming a peripheral burr in the form of an upstanding pointed ridge on the first side of the metal blank; and without forming the edges of the metal blank, adhering a protective film to the first side and extending to the edges so as to cover the peripheral burr, making the film sufficiently thick to shield the pointed ridge of the burr.

11. A method as in claim 10, wherein the step of adhering comprises applying a layer of transparent varnish over the first side and the peripheral burr, and causing the varnish to form a smooth coating over the pointed ridge for shielding same.

12. A method as in claim 11, wherein the step of applying the layer of varnish includes passing the metal blank through a nip between an application roller and a support roller of a roll coater.

13. A method as in claim 10, further including the step of applying an indicia on one of the first and second sides of the metal blank.

14. A method as in claim 13 where the indicia includes printing on the surface of the blank.

15. A method as in claim 14 wherein the indicia further includes an embossed region.

16. A method as in claim 10 wherein the step of adhering comprises covering the first side from edge to edge with a plastic film, and laminating the film in place to form a protective film over the pointed ridge for shielding same.

* * * * *